(12) United States Patent
Hirota et al.

(10) Patent No.: US 6,813,906 B1
(45) Date of Patent: Nov. 9, 2004

(54) METHOD AND APPARATUS FOR PREPARATION OF MOLDED GLASS

(75) Inventors: Shinichiro Hirota, Fuchu (JP); Kishio Sugawara, Hamura (JP)

(73) Assignee: Hoya Corporation, Tokyo (JP)

( * ) Notice: Subject to any disclaimer, the term of this patent is extended or adjusted under 35 U.S.C. 154(b) by 371 days.

(21) Appl. No.: 09/699,362

(22) Filed: Oct. 31, 2000

(30) Foreign Application Priority Data

Nov. 1, 1999 (JP) .......................................... 11-311458

(51) Int. Cl.[7] .............................. C03B 9/40; C03B 11/16

(52) U.S. Cl. .............................. 65/323; 65/305; 65/307; 65/315; 65/317; 65/322; 425/352

(58) Field of Search ......................... 65/305, 307, 315, 65/317, 322, 323; 425/352

(56) References Cited

U.S. PATENT DOCUMENTS

| 1,655,917 | A | * | 1/1928 | Obiol | 65/305 |
| 1,909,374 | A | * | 5/1933 | McNamara | 65/305 |
| 2,526,588 | A | * | 10/1950 | Small | 65/305 |

FOREIGN PATENT DOCUMENTS

JP        11-49523    *   2/1999

* cited by examiner

Primary Examiner—Michael Colaianni
(74) Attorney, Agent, or Firm—Burns, Doane, Swecker & Mathis, L.L.P.

(57) ABSTRACT

A molded glass article manufacturing device, having a means of forcefully separating a molded glass article attached to the forming surface of an upper mold or a lower mold, and readily and reliably aligning the axes of the upper mold and lower mold, a molded glass article manufacturing method, and a method of assembling a molded glass article manufacturing device are provided. A molded glass article manufacturing device comprising a drum capable of regulating an upper mold and a lower mold having opposing forming surfaces so that the displacement axes thereof align; a forced mold separating means separating a molded glass article adhered to a forming surface from the mold by contact with at least the rim portion of the molded glass object; and a displacement means for displacing said forced mold separating means relative to said upper mold or said lower mold so that, in the course of separation of said upper mold and said lower mold, said forced mold separating means contacts at least the rim portion of said molded glass article and separates said molded glass article from the forming surface. Further, a manufacturing method for molded glass articles employing this device and a method of assembling molded glass article manufacturing devices are disclosed.

17 Claims, 8 Drawing Sheets

METHOD AND APPARATUS FOR PREPARATION OF MOLDED GLASS

This application claims priority under 35 U.S.C. §§ 119 and/or 365 to 311458/1999 filed in Japan on Nov. 1, 1999; the entire content of which is hereby incorporated by reference.

1. Technical Field

The present invention relates to forming molds that are suited to the manufacture of molded glass articles such as high-precision lenses and do not require cutting or polishing following press molding. The present invention also relates to methods of molding glass articles employing these forming molds. The present invention further relates to methods of assembling formed glass article manufacturing devices suited to the manufacture of formed glass articles such as high-precision lenses.

2. Background Art

A great number of techniques for producing molded glass articles such as high-precision lenses by forming in mold presses have been developed in recent years. These molding techniques can be divided into roughly two categories. In the first method, the glass material to be molded is placed in the forming mold at room temperature outside the molding device. Next, the forming mold into which the glass material to be molded has been placed is placed in the device, a number of sections within the device are moved to conduct heated pressing and cooling, the forming mold is removed from the device, and the molded glass article is removed from the forming mold outside the device.

By contrast, in the second method, a forming mold is employed in which an upper mold and a lower mold are mounted in advance on vertical press shafts within the device. In this method, the glass material to be molded is supplied at room temperature onto the forming surface of the lower mold, and in that state, the forming mold is heated to heat the glass material to be molded. The glass material is pressed, cooled, and removed from the device upon reaching room temperature. However, in the preferred method, the glass material to be molded is heated separately from the forming mold, transferred to the forming mold, pressed (sometimes heated and pressed), and released from the mold once it has been cooled to below the transition point of the glass. The molded glass article is then immediately removed from the mold. Since this method does not require that the forming mold be brought down to room temperature, an extremely short molding cycle and efficient production are possible.

A number of conditions must be satisfied to produce a formed glass article such as a high-precision lens by heating the forming mold to a temperature corresponding to a glass viscosity of $10^8$–$10^{12}$ poise, heating the glass material being molded to a temperature equal to or greater than that of the forming mold, press forming the glass material being molded with the forming mold, cooling the glass material being molded to below the transition temperature of the glass, releasing the mold, and removing the molded glass article from the forming mold.

The forming surface of the forming mold must be machined to a high surface precision and a fine surface roughness, and must not fuse with the glass as a result of press forming. To perform as a lens, specifications such as thickness, outer diameter, surface precision, eccentricity precision (axial shift, tilt), and outer appearance must be met. Although the formed glass article is released immediately from the mold once cooled to below the transition point of the glass, it is extremely important to achieving stable, continuous production that the upper mold not adhere to the formed glass article during that process and that the formed glass article come out smoothly. During mold release, cooling to below the glass transition point is required to achieve surface precision. Additionally, shrinkage tends to occur when the mold is released at a temperature exceeding the glass transition point. Such problems do not occur at below the glass transition point so long as the glass consolidates.

Further, rapid heating and cooling of the forming mold are desirable from the perspective of improving production efficiency by shortening the molding cycle time to the extent possible.

The present inventors have developed and proposed a forming mold (Japanese Patent Application Publication No. Hei 11-49523) that can be employed in methods satisfying the above-stated requirements. The structure of this forming mold is shown in FIG. 9, and a schematic of the forming method employing this forming mold is given in FIG. 10. However, it has become clear that the following problems tend to occur due to the mold structure in the molding method employing this forming mold.

The molding device for formed glass articles shown in FIG. 9 is equipped with a forming mold 110; a drive mechanism comprised of a cylinder and the like for vertically displacing forming mold upper member 114 in a manner described further below; a heater for heating prescribed members comprising forming mold 110, such as upper mold 120 and lower mold 130; and a high-frequency coil.

Forming mold 110 is roughly cylindrical in shape and comprises a forming mold upper member 112 secured at prescribed positions and a forming mold lower member 114 capable of being moved vertically by a cylinder (not shown). Forming mold upper member 112 is provided with a roughly cylindrical first upper matrix 116, a hollow cylindrical second upper matrix 118 positioned beneath upper matrix 116 and secured to upper matrix 116, and an upper mold 120 inserted into second upper matrix 118 and disposed with a matching center shaft. An upper mold descent stop ring 122 [sic: 127] concentric with, and positioned radially between, second upper matrix 118 and upper mold 120; a sleeve 124, positioned concentrically with upper matrix 118 and upper mold 120 and positioned further to the forming surface side of upper mold 120 than upper mold descent stop ring 122; and a spring 125 pushing against sleeve 124 between upper mold descent stop ring 122 and sleeve 124 are also provided.

Additionally, forming mold lower member 114 is provided with a [first] lower matrix 126, secured on its lower surface to a cylinder (not shown); a hollow cylindrical second lower matrix 128 secured to [first] lower matrix 126, and a lower mold 130, positioned concentrically with [second] lower matrix 128 and configured so as to permit the placing of a glass material onto the forming surface, or upper surface, thereof. [Second] lower matrix 128 is positioned by means of a protrusion 148.

Prior to insertion of lower mold 130 into sleeve 124 (as shown in FIG. 10(b)), the center shaft of the upper mold and the center shaft of the lower mold are not necessarily perfectly aligned. Even once the lower mold has been inserted into the sleeve (as shown in FIG. 10(c)), the sleeve dangles loosely in a vertical direction from the spring. Further, the clearance between sleeve 124 and upper mold 120 on the one hand, and upper matrix 180, on the other, may result in radial shifting. A protrusion for contacting and scraping away the formed article that has adhered to the forming surface of the upper mold is provided on the inner surface of sleeve 124. The clearance between sleeve 124 and the inside of upper mold 120 is adjusted so that when sleeve 124 slides vertically, the protrusion on its inner surface contacts the outermost rim portion of the molded article. Thus, while the clearance in a common forming mold is about 2–10 μm between the drum and the forming mold, in the mold shown in FIG. 10, for the above-stated reasons, the spacing between sleeve 124 and the inside of upper mold 120 ranges from about 0.1 to 5 mm.

Thus, sleeve 124 is kept in a dangling state by the spring and has considerable clearance with the upper mold. There is also a prescribed clearance between lower mold 130 and sleeve 124. Thus, in this state, sleeve 124 sometimes tilts within the above-stated prescribed clearance. When sleeve 124 tilts, a tilt develops between lower mold 130 and upper mold 120. Conducting press molding (as shown in FIGS. 10(d) and (e) by force in this state results in shifting of the optical axis of the lens obtained, precluding eccentricity precision. When the lens obtained is the microlens in a laser optical system, failure results due to frame aberration. When pressing is conducted with the mold in a tilted state, the sleeve bites into the upper mold, no longer moves freely in a vertical direction, fails to be pushed down by the spring during mold release, and as a result, sometimes prevents the molded glass article adhered to the upper mold from being released from the mold.

As a result, it has not been possible to manufacture with high production efficiency molded glass products having high surface precision.

Accordingly, the object of the present invention is to provide a molding device for manufacturing molded glass articles in which the above-stated problems have been solved. That is, the present invention has for its object to provide a molded glass article manufacturing device having a means of forcing release from the mold by contacting the outer rim area of a molded glass article that has adhered to the forming surface of the upper mold or lower mold, in which the shafts of the upper mold and lower mold can be readily and reliably aligned.

A further object of the present invention is to provide methods of molding glass articles in which the above-described forming molds are employed to manufacture with high production efficiency molded glass articles having high surface precision and eccentricity precision.

A still further object of the present invention is to provide a reliable method of advance axis alignment so as to permit molding even when the displacement axes of the upper mold and/or lower mold within a drum or the like are not regulated.

SUMMARY OF THE INVENTION

The above-stated objects are achieved by the above-described molded glass article manufacturing device, equipped with an upper mold and a lower mold capable of separating from, and approaching, each other and having opposing forming surfaces, wherein said upper mold and said lower mold separate from each other in the course of supplying a glass material to the forming surface of said lower mold and in the course of removing the molded glass article from the forming surface of said lower mold; characterized by comprising:

a drum capable of regulating said upper mold and said lower mold so that the displacement axes thereof align;

a forced mold separating means separating said molded glass article adhered to a forming surface from the mold by contact with at least the rim portion of said molded glass object; and a displacement means for displacing said forced mold separating means relative to said upper mold or said lower mold so that, in the course of separation of said upper mold and said lower mold, said forced mold separating means contacts at least the rim portion of said molded glass article and separates said molded glass article from the forming surface.

The present invention further relates to a manufacturing method for molded glass articles comprising a step of pressing a heated glass material with an upper mold and a lower mold, a step of cooling said molded glass article produced by pressing, and a step of separating said cooled molded glass article from the mold; characterized in that:

the device of the present invention is employed;

said glass material is pressed so that the outer diameter of said molded glass article becomes larger than the outer diameter of the forming surface of the upper mold in said pressing step; and the rim portion of said molded glass article and a portion of the forced mold separating means come into contact during the step of separation from the mold and said upper mold and said forced mold separating means are displaced relative to each other so that said molded glass article adhered to said upper mold forming surface is separated from the upper mold forming surface to separate said molded glass article adhered to said upper mold forming surface from the mold.

The present invention further relates to a manufacturing method for molded glass articles comprising a step of pressing a heated glass material with an upper mold and a lower mold, a step of cooling said molded glass article produced by pressing, and a step of separating said cooled molded glass article from the mold; characterized in that:

the device of the present invention is employed;

said glass material is pressed so that the outer diameter of said molded glass article becomes larger than the outer diameter of the forming surface of the lower mold in said pressing step; and the rim portion of said molded glass article and a portion of the forced mold separating means come into contact during the step of separation from the mold and said lower mold and said forced mold separating means are displaced relative to each other so that said molded glass article adhered to said lower mold forming surface is separated from the lower mold forming surface to separate said molded glass article adhered to said lower mold forming surface from the mold.

The present invention further relates to a method of assembling a molded glass article manufacturing device equipped with an upper mold and a lower mold capable of separating from, and approaching, each other, said upper mold being secured to an upper main shaft, said lower mold being secured to a lower main shaft, and said upper mold and said lower mold having opposing forming surfaces;

characterized in that said upper mold is directly or indirectly secured to said upper main shaft and said lower mold is likewise secured to said lower main shaft so as to be held in a centering holder in such a manner that the displacement axes of said upper mold and said lower mold are aligned.

BEST MODE OF IMPLEMENTING THE INVENTION

Figure 1:
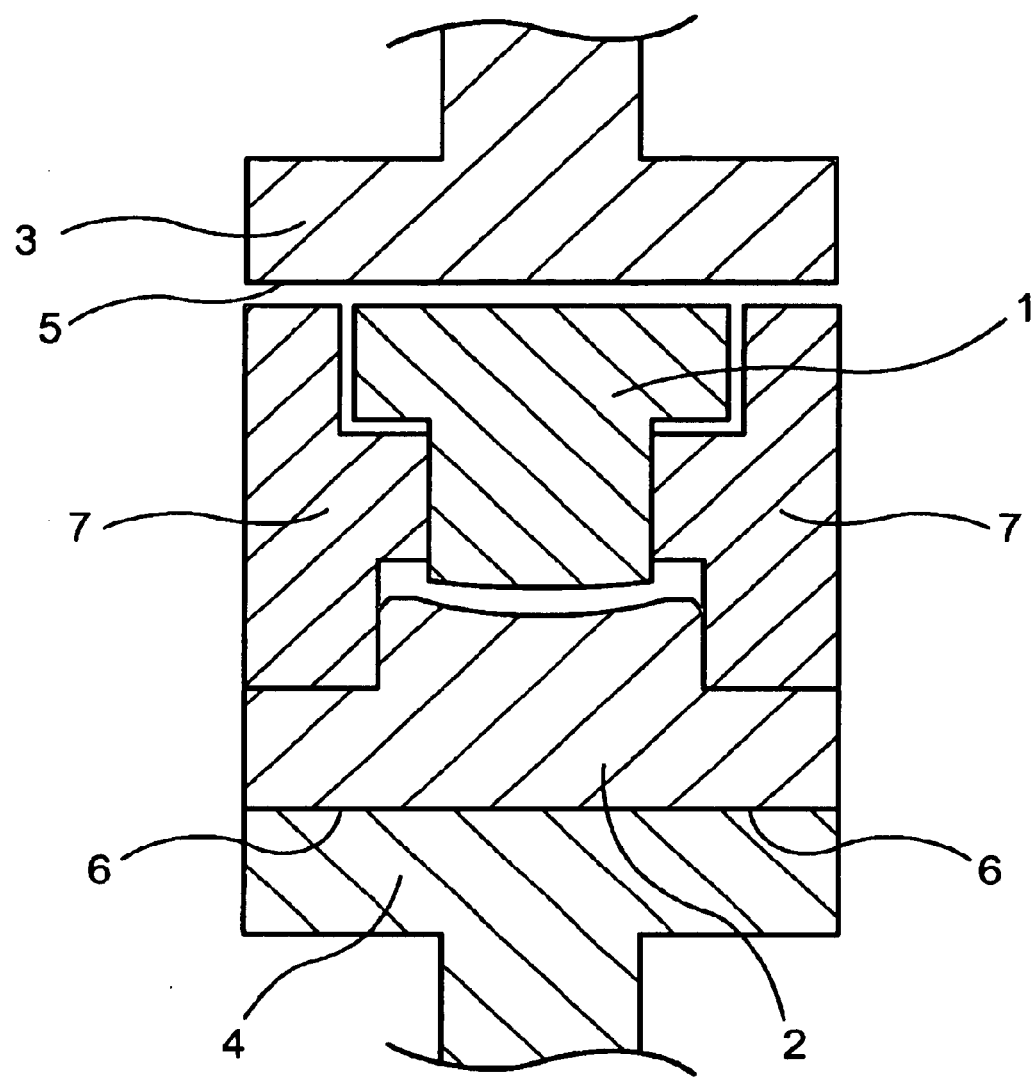
FIG. 1 is a schematic view of the molding device for molded glass articles employed in Embodiment 1.

The Molded Glass Article Manufacturing Device of the Present Invention

The molded glass article manufacturing device of the present invention is equipped with an upper mold and a lower mold capable of separating from, and approaching, each other and having opposing forming surfaces. Further, the molded glass article manufacturing device of the present invention has a structure permitting separation of said upper mold and lower mold in the course of supplying glass material to the lower mold forming surface and removal of the molded glass article from the lower mold forming surface. Japanese Patent Application Publication No. Hei 11-49523, for example, describes a device having such a configuration, the materials and structure of the upper mold and lower mold, and a method of separating the upper mold and lower mold in the course of supplying a glass material to the lower mold forming surface and in the course of removing the molded glass article from the lower mold forming surface.

In the molded glass article manufacturing device of the present invention as described in detail below in the embodiments, it is possible for there to be an upper matrix, an upper sleeve, or the like in addition to an upper mold, and a lower matrix, a lower sleeve, or the like in addition to the lower mold.

Examples of the materials employed in the upper mold and lower mold are metals such as Mo and W, ultrahard alloys such as WC, and ceramics such as silicon carbide, silicon nitride, titanium carbide, titanium nitride, aluminum nitride, and tungsten carbide. A protective layer is desirably formed on the forming surfaces of the upper mold and lower mold to improve oxidation resistance, durability, and corrosion resistance. Examples of protective films are thin films comprised of noble metal materials containing Pt, Rh, Au, Re, Os, Ir, or the like; hard carbon films; thin films of carbon such as diamond-like carbon; thin films of ceramics such as SiC, $Si_3N_4$, titanium carbide, titanium nitride, and alumina; and thin films of compound materials thereof. The thin film may be, for example, formed by sputtering, ion plating, or CVD, and may be a single-layer film or a multilayer film comprised of different materials.

The molded glass article formed by the device of the present invention may be an optical element. More specifically, it may be a concave lens, convex lens, meniscus lens, concave meniscus lens, or some other aspheric surface lens; or any of a variety of optical elements such as cylindrical lenses. The molded glass article may also be, for example, a disk substrate.

One characteristic of the molded glass article manufacturing device of the present invention is the presence of a drum in the device having a means of moving the forced mold separating means described further below, separate from the forced mold separating means, regulating the upper mold and the lower mold so that the displacement axes thereof align. In the above-described prior art device, tilting of the sleeve, which is the means of forcing separation of the molded glass article from the mold, results in tilting between the upper and lower mold, sometimes resulting in shifting of the optical axis of the molded glass article obtained (a lens, for example) and precluding eccentricity precision. By contrast, in the device of the present invention, vertical motion of the upper mold and lower mold is directly or indirectly regulated, permitting reliable axial alignment of the upper mold and lower mold. As a result, the optical axis of the molded glass article obtained (a lens, for example) does not shift and high eccentricity precision is possible.

Regulation of the vertical movement of the upper mold and lower mold by the drum may be direct regulation by which the drum, lower mold, and upper mold slide together while remaining in partial contact, or may be indirect regulation through some other member. The drum may also simultaneously regulate vertical movement of the forced mold separating means.

When the drum directly regulates vertical movement of the upper mold and lower mold, the use of a drum having an inner perimeter with a spacing relative to the upper mold and lower mold falling within a range of 2–10 $\mu$m, preferably 2–6 $\mu$m, is appropriate from the perspective of permitting ready and reliable axial alignment of the upper mold and lower mold.

Further, the molded glass article manufacturing device of the present invention has a forced mold separating means separating the molded glass article adhered to the forming surface from the mold, and a means of moving the forced mold separating means relative to the upper mold and the lower mold.

The forced mold separating means contacts at least a portion of the outer rim of the molded glass article to separate the molded glass article adhered to the forming surface from the mold. The contact between the forced mold separating means and at least a portion of the outer rim of the molded glass article adhered to the forming surface is achieved by displacing the forced mold separating means relative to the upper mold or lower mold by means of the operation of a displacement means, described further below. Further, this displacement is conducted so as to separate the molded glass article coming into contact with the forced mold separating means from the forming surface. That is, the forced mold separating means is displaced relative to the upper mold or lower mold by a distance adequate to separate the molded glass article from the forming surface. The operation of the forced mold separating means during separation of the molded glass article is described in detail in the description of the displacement means further below.

Further, the forced mold separating means may be configured so as not to be in contact with the molded glass article that is formed by pressure by directly or indirectly pressing the lower mold upward, or by directly or indirectly pressing the upper mold downward, in the course of bringing together the upper mold and lower mold to press the glass material. Thus, during forming of the molded glass article by pressing the glass material, the forced mold separating device and the molded glass article are in a state of non-contact so that forming of the molded glass article is not impeded. Then, only when the upper and lower mold separate to permit release of the molded glass article from the mold does the molded glass article contact the forced mold separating means and separate from the forming surface.

More specifically, the forced mold separating means can be configured to separate a molded glass article adhered to the upper mold forming surface from the [upper] mold [forming surface] by contacting at least a portion of the outer rim of the molded glass article, or configured to separate a molded glass article adhered to the lower mold forming surface from the lower mold surface by contacting at least a portion of the outer rim of the molded glass article.

The forced mold separating means for molded glass articles adhered to the upper mold forming surface may, for example, be a cylindrical member that is slipped over the upper mold so as to come into contact with at least a portion of the outer rim of a molded glass article adhered to the upper mold forming surface. Further, the forced mold separating means for molded glass articles adhered to the lower mold forming surface may be a cylindrical member that is slipped over the lower mold so as to come into contact with at least a portion of the outer rim of a molded glass article adhered to the lower mold forming surface.

The spacing between the portion of the forced mold separating means contacting the molded glass article and the upper mold or lower mold is appropriately set so as to permit contact between this contact portion and the area of the outer rim portion of the molded glass article. For example, the clearance between the portion of the forced mold separating means contacting the molded glass article and the outer rim of the forming surface of the upper mold is suitably set so that this contact portion contacts the area of the outer rim portion of the molded glass article. Further, the clearance between the portion of the forced mold separating means contacting the molded glass article and the outer rim of the forming surface of the lower mold is suitably set so that this contact portion contacts the area of the outer rim portion of the molded glass article.

Specifically, the clearance between the portion of the forced mold separating means contacting the molded glass article and the outer rim of the forming surface of the upper mold or lower mold is suitably set, for example, to fall within a range of 0.015–0.1 mm.

The displacement means is configured to displace the forced mold separating means relative to the upper mold or lower mold so as to bring the forced mold separating means into contact with at least a portion of the rim of the molded glass article and separate the molded glass article from the forming surface in the course of separation of the upper mold and lower mold.

When the forced mold separating means is configured to separate a molded glass article adhered to the upper mold forming surface, the displacement means may be an energizing means storing an energizing force by being compressed when the forced mold separating means is directly or indirectly pressed upward by the lower mold. When the forced mold separating means is pressed upward by the lower mold and the molded glass article is pressed, the upper mold and the lower mold approach each other and the forced mold separating means is also brought close to the lower mold. Upward pressing of the forced mold separating means by the lower mold can be performed directly based on contact with the lower mold through the structure (component members) of the molding device, and indirectly through the lower matrix. Such an energizing means can also be configured by causing the lower mold to further move the forced mold separating means during separation of the upper mold and lower mold. A forced mold separating means that is caused to be further moved by the lower mold by means of the energizing means can be configured to contact and separate the molded glass article adhered to the upper mold forming surface during this additional movement.

Further, when the forced mold separating means is configured to separate a molded glass article adhered to the lower mold forming surface from the lower mold forming surface, the displacement means can be an energizing means storing an energizing force by being compressed when the forced mold separating means is directly or indirectly pressed downward by the upper mold. When the forced mold separating means is pressed downward by the upper mold and the molded glass article is pressed, the upper mold and the lower mold approach each other and the forced mold separating means is also brought close to the upper mold. Downward pressing of the forced mold separating means by the upper mold can be performed directly based on contact with the upper mold through the structure (component members) of the molding device, and indirectly through the upper matrix. Such an energizing means can also be configured by causing the upper mold to further move the forced mold separating means during separation of the upper mold and lower mold. A forced mold separating means that is caused to be further moved by the upper mold by means of the energizing means can be configured to contact and separate the molded glass article adhered to the lower mold forming surface during this additional movement.

The energizing means may be, for example, an elastic member such as a [common] spring, a bar spring, or a plate spring. Although the displacement means may be something other than an energizing means, the use of an energizing means affords advantages in the form of simplified mounting and device configuration.

The forced mold separating means can be comprised of a heat-resistant material such as SUS (stainless steel) or a tungsten alloy. The energizing means may be an elastic member comprised of a heat-resistant material, for example, a ceramic such as zirconia.

By comprising a forced mold separating means and a displacement means such as those set forth above, the device of the present invention reliably separates the molded glass article from the forming surface of the upper mold or lower mold. Thus, efficient, sustained production of molded glass articles becomes possible.

The Method of Manufacturing Molded Glass Articles of the Present Invention

The method of manufacturing molded glass articles of the present invention is described below.

The first manufacturing method of the present invention employs the device of the present invention comprising a forced mold separating means for removing a molded glass article adhered to the upper mold forming surface (described in claims 1–8).

In a pressurizing step, a glass material is subjected to pressure so that the outer diameter of the molded glass article becomes larger than the outer diameter of the forming surface of the upper mold. In a mold separation step, when the molded glass article is adhered to the upper mold forming surface, the (rim) portion of the molded glass article extending beyond the outer diameter of the forming surface is contacted by the forced mold separating means. Further, when the forced mold separating means moves relative to the upper mold, the molded glass article adhered to the upper mold forming surface is separated from the upper mold forming surface and the released molded glass article is readily recovered from the lower mold forming surface. Since the molded glass article adhered to the upper mold forming surface can be reliably separated from the mold by just the vertical movement of the upper mold and the lower mold in this manner, efficient, sustained production of molded glass articles becomes possible.

The second manufacturing method of the present invention employs the device of the present invention comprising a forced mold separating means for removing a molded glass article adhered to the lower mold forming surface from the lower mold forming surface (described in claim 1 and claims 9–14).

In a pressurizing step, a glass material is subjected to pressure so that the outer diameter of the molded glass article becomes larger than the outer diameter of the forming surface of the lower mold. In a mold separation step, when the molded glass article is adhered to the lower mold forming surface, the (rim) portion of the molded glass article extending beyond the outer diameter of the forming surface is contacted by the forced mold separating means. Further, when the forced mold separating means moves relative to the lower mold, the molded glass article adhered to the lower mold forming surface is separated from the lower mold forming surface and the released molded glass article is readily recovered by a suitable means. Since the molded glass article adhered to the lower mold forming surface is forcefully separated from the lower mold forming surface in this manner, efficient, sustained production of molded glass articles becomes possible.

Both the first and second manufacturing methods of the present invention comprise a step of pressurizing a glass material by means of the upper mold and lower mold, a step of cooling the molded glass article that has been pressed, and a step of separating the molded glass article that has been cooled. For example, the manufacturing method for molded glass articles comprising a glass material pressurizing step, a cooling step, and a mold separating step; the various glass materials; and the conditions of the various steps that are described in Japanese Patent Application Publication No. Hei 11-49523 can be used without modification. The molded glass article manufactured by the method of the present invention can be an optical element; more specifically, a concave lens, a convex lens, a meniscus lens, or some other aspheric surface lens; or various other optical elements such as a cylindrical lens. The molded glass article may also be a substrate for electrical devices, such as a disk substrate.

The Method of Assembling Molded Glass Article Manufacturing Devices of the Present Invention The method of assembling molded glass article manufacturing devices of the present invention is a method of assembling a molded glass article manufacturing device equipped with an upper mold and a lower mold capable of separating from, and approaching, each other, in which the upper mold is secured to a main upper shaft, the lower mold is secured to a main lower shaft, and the upper mold and lower mold have opposing forming surfaces. Examples of devices that can be applied to the assembly method of the present invention include both devices not having "a drum capable of regulating said upper mold and said lower mold so that the displacement axes thereof align" and devices identical to the molded glass article manufacturing devices of the present invention set forth above. The device has a forced mold separating means and a displacement means. The forced mold separating means is a means of separating a molded glass article adhered to the forming surface from the mold by contacting at least a portion of the rim of the molded glass article. The displacement means is a means of displacing the forced mold separating means relative to the upper mold or lower mold in the course of separation of the upper mold and the lower mold so that the forced mold separating means contacts at least a portion of the rim of the molded glass article and separates the molded glass article from the forming surface.

The assembly method of the present invention is employed to assemble a forming mold comprising an upper mold and a lower mold configured in a molded glass article manufacturing device comprising a forced mold separating means and a displacement means such as those set forth above. In the assembly method of the present invention, the upper mold and lower mold are held in a centering holder in such a manner that the displacement axes of the upper mold and lower mold are aligned, and the upper mold is directly or indirectly secured to the main upper shaft and the lower mold is likewise secured to the main lower shaft.

In addition for it being possible for the upper mold to be directly secured to the upper main shaft and the lower mold to be likewise secured to the lower main shaft, the upper mold may be directly secured to the upper main shaft and the lower mold indirectly secured, as, for example, through another member, to the lower main shaft, or the upper mold may be indirectly secured, as, for example, directly secured through another member, to the upper main shaft, and the lower mold directly secured to the lower main shaft. Additionally, both the upper mold and the lower mold may be indirectly connected to the upper main shaft and lower main shaft, respectively.

The example in which both the upper mold and the lower mold are directly secured to the upper main shaft and lower main shaft, respectively, will be described first. The lower mold is placed at a prescribed position on the lower main shaft; the lower main shaft and the lower mold are temporarily secured, as needed; and one (upper) of the openings of the centering holder is slipped over the rim of the lower mold. The upper mold is then inserted into the other (upper) opening of the centering holder. After the upper mold and the lower mold have been placed in the centering holder so that the displacement axes of the upper mold and lower mold are aligned, the upper mold is secured to the main upper shaft. The lower mold is also secured to the main lower shaft.

The example in which the upper mold and the lower mold are both indirectly secured to the main upper shaft and the main lower shaft, respectively, will be described. Another member, for example, a mold support member, is secured to the lower main shaft, the lower mold is positioned at a prescribed spot on the mold support member, the mold support member and the lower mold are temporarily secured, as needed, and the centering holder is positioned so that one (lower) of the openings of the centering holder slips over the rim of the lower mold. Next, the upper mold is inserted into the other (upper) opening of the centering holder. Once the upper mold and the lower mold have been placed in the centering holder so that the displacement axes of the upper mold and lower mold are aligned, the upper mold is secured to another member, for example, a mold support member, that has been secured to the main upper shaft. The lower mold is also secured to the above-mentioned mold support member secured to the main lower shaft.

In a device being assembled by the method of the present invention, the displacement axes of the main upper shaft and the main lower shaft are preset so as to be aligned. Securing the upper mold and the lower mold so that their displacement axes are aligned with a main upper shaft and a main lower shaft set so that their displacement axes are aligned in such a device keeps the upper mold and lower mold axes constant and permits the manufacturing of molded glass articles even when, for example, the forced mold separating means is configured as a sleeve, the displacement axes of the upper mold and lower mold can be regulated to some degree but are not precisely regulated, and axial shifting occurs.

Embodiments

Embodiments of the present invention are described below with reference to the appended drawings.

Embodiment 1

FIG. 1 shows the method of assembling the molded glass article manufacturing device of the present invention. FIG. 1(a) [sic] shows the forming mold set on the pressing shaft (not shown). Upper mold 1 and lower mold 2 are comprised of a binderless ultrahard alloy and the forming surfaces thereof are coated with a protective film in the form of a thin film of Pt—Rh—Au—Ir alloy.

Upper main shaft 3 and lower main shaft 4 are precisely aligned. Upper main shaft 3 and lower main shaft 4 can be mold support members connecting the forming molds (upper mold 1 and lower mold 2) to the main shafts. That is, in FIG. 1, upper mold 1 is directly secured to upper main shaft 3 and lower mold 2 is directly secured to lower main shaft 4. However, mold support members can be present between upper mold 1 and main upper shaft 3, and lower mold 2 and main lower shaft 4, and the forming molds and main shafts indirectly secured.

Figure 2C:
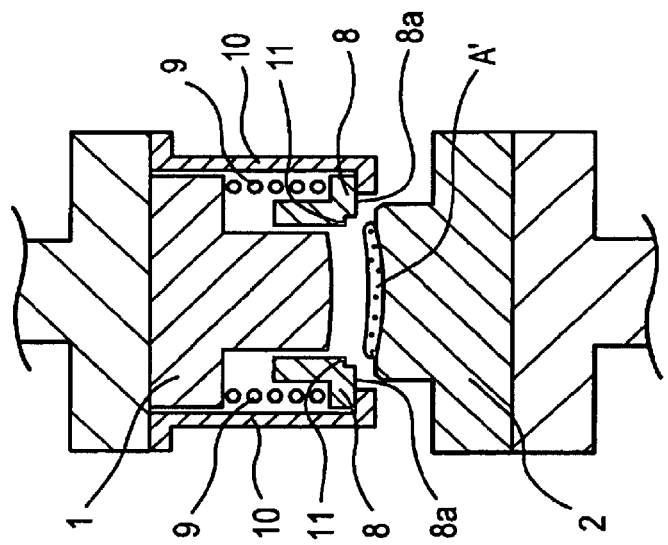
FIG. 2 is a drawing showing operation of the molding device for molded glass articles in Embodiment 1.

The lower surface 5 of main upper shaft 3 and the upper surface 6 of main lower shaft 4 are formed to be precisely parallel. The upper and lower molds are placed within centering hold 7, which is a drum. With the centers of upper mold 1 and lower mold 2 protruding, lower mold 2 is first set with bolts (not shown) to main lower shaft 4. Main upper shaft 4 is then raised up and stopped when it strikes main upper shaft 3, or slightly before, and set with bolts (not shown) to main upper shaft 3. Main lower shaft 4 is then dropped and centering holder 7 is removed. Upper mold 1 and lower mold 2 have thus been set to the press shafts in a centered state. Next, as shown in FIG. 2(a), a mold separating ring stop 10 containing a forced mold separating means in the form of mold separating ring 8 and a displacement means (energizing means) in the form of spring 9 is mounted to upper main shaft 3. In this example, the mold separating ring and mold separating ring stop are made of stainless steel and the spring is made of zirconia.

The molded article manufacturing device assembled in the above-described manner is placed in a non-oxidizing atmosphere and the forming molds are heated with a high-frequency induction heating coil (not shown) disposed around the forming molds. Lower mold 2 is lowered to separate lower mold 2 and upper mold 1 and a glass material that has been softened by heating to a prescribed temperature at a location different from that of the forming molds is transferred to the forming surface of lower mold 2 by a glass material carrying jig (not shown).

In this form of the embodiment, the softening by heating of the glass material can be conducted by floating the body of glass material on a gas flow. The heat-softened glass material is transferred to lower mold 2 which has been preheated to a prescribed temperature by a heater (not shown).

It is extremely difficult to prevent the jig holding the glass material during heating from fusing with the glass in the low viscosity range where the glass material changes shape due to its own weight. By contrast, gas can be blown out from the interior of the jig to float the glass material on a gas flow, forming a layer of gas on both the surface of the jig and the surface of the glass. As a result, heat-softening is desirably conducted without any reaction between the jig and glass. Further, when the glass material has been preformed, the heat-softening can be conducted while maintaining the preformed shape. Even when the glass material is in the form of a gob and there are surface defects such as furrowing of irregular shape, heat-softening while floating the gob on a gas flow can adjust the shape and eliminate surface defects.

As set forth above, floating a glass material and transferring a glass material that has been heat softened to a preheated forming mold are disclosed in Japanese Patent Application Publication No. Hei 8-133758. The phrase "heating the glass material" includes heating from ordinary temperature to a prescribed temperature, further heating glass that is already at a certain temperature, and employing glass that has already been heated to a prescribed temperature. For example, when the glass material is a glass gob, a glass gob produced from molten glass can be employed without cooling.

Thus, the glass material is conveyed onto the forming surface of lower mold 2. The lower mold is then heated and press molding is conducted (in the present embodiment, a convex meniscus lens 20 mm in press diameter is formed).

FIG. 2(a) shows the situation immediately prior to press molding. Glass material A has been placed on the forming surface of lower mold 2. Mold separating ring 8 has been pushed down by spring 9 but is being stopped by mold separating ring stop 10.

Figure 2B:
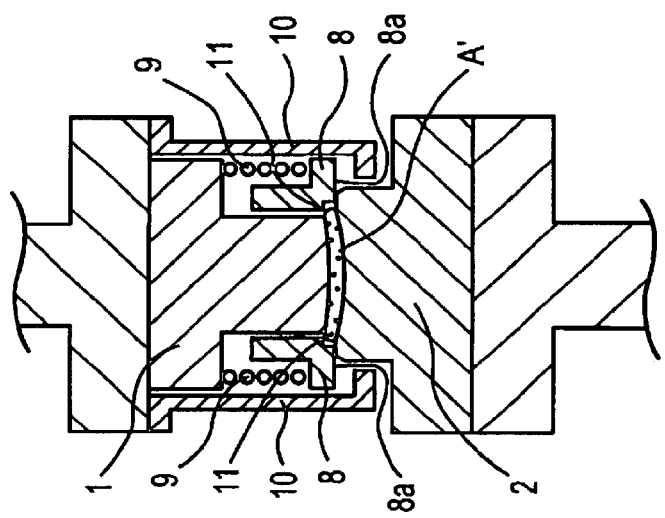
Figure 2A:
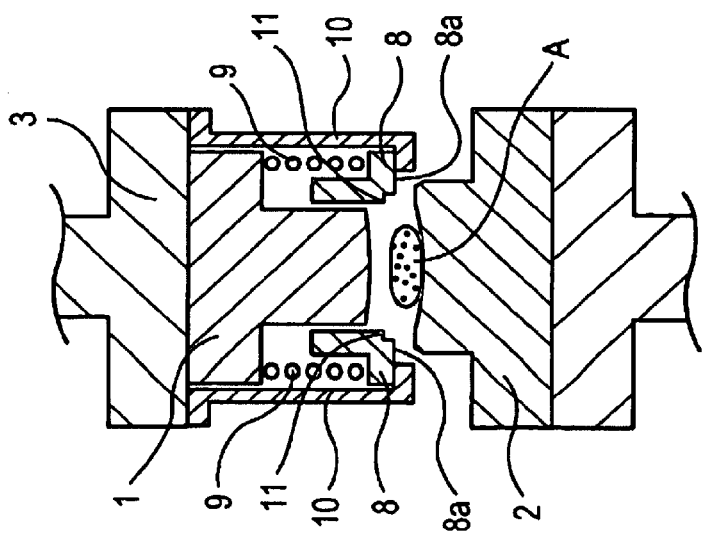

FIG. 2(b) shows the situation during press molding. This time, the lower surface 8a of mold separating ring 8 that was stopped by mold separating ring stop 10 strikes against the edge of the upper surface of lower mold 2 (the forming surface), causing it to be pushed up. The step 11 in mold separating ring 8 moves above the forming surface of upper mold 1 to a position where it will not contact the perimeter of the molded glass article that is pressed out during molding. The pushing up of mold separating ring 8 compresses spring 9, storing an energizing force. Pressing causes the outer diameter of molded glass article A' to increase to slightly larger than the outer diameter of the forming surface of upper mold 1, as shown in FIG. 2(b). During pressing, since step 11 of mold separating ring 8 is positioned on the outer perimeter of upper mold 1 as shown in FIG. 2(b) and is higher than the outer perimeter of the molded glass article, mold separating ring 8 and step 11 do not contact molded glass article A'.

The initial pressing conditions were suitably selected so that the temperature of the forming mold corresponded to a glass viscosity of $10^8$–$10^{12}$ poise and the temperature of the glass material to be molded was equal to or higher than the forming mold temperature. A pressure of 100 kg/cm$^2$ was applied until a thickness 0.02 mm greater than a prescribed thickness was reached. The pressure was removed, the product was cooled by cutting off the power (forced cooling with gas is also suitable), and the remaining 0.02 mm was extended at a pressure of 30 kg/cm².

When the forming mold temperature had dropped to below the glass transition temperature, lower mold 2 was moved downward and the mold was released, as shown in FIG. 2(c). Simultaneous with the dropping of lower mold 2, the force of spring 9 caused mold separating ring 8 to drop. When molded glass article A' adhered to the forming surface of upper mold 1, step 11 in dropping mold separating ring 8 contacted the outer rim of molded glass article A', and as it was pushed further downward, separated molded glass article A' from the forming surface of upper mold 1. (For comparison, when the above molding operation was conducted without mold separating ring 8 being present, molded glass article A' adhered to the upper mold.) After mold separation, lower mold 2 was dropped still further and a suction pad removed molded glass article A' from lower mold 2.

After removing molded glass article A' from where it was on upper mold 2, the temperature of the forming mold was immediately restored by heating with a high-frequency induction heater and the next round of molding was conducted.

The molded glass article obtained was extremely good from the viewpoints of thickness, surface precision, axial shift, and tilt. The outer diameter [portion] was removed in a subsequent step, yielding the final product.

Embodiment 2

Figure 3:
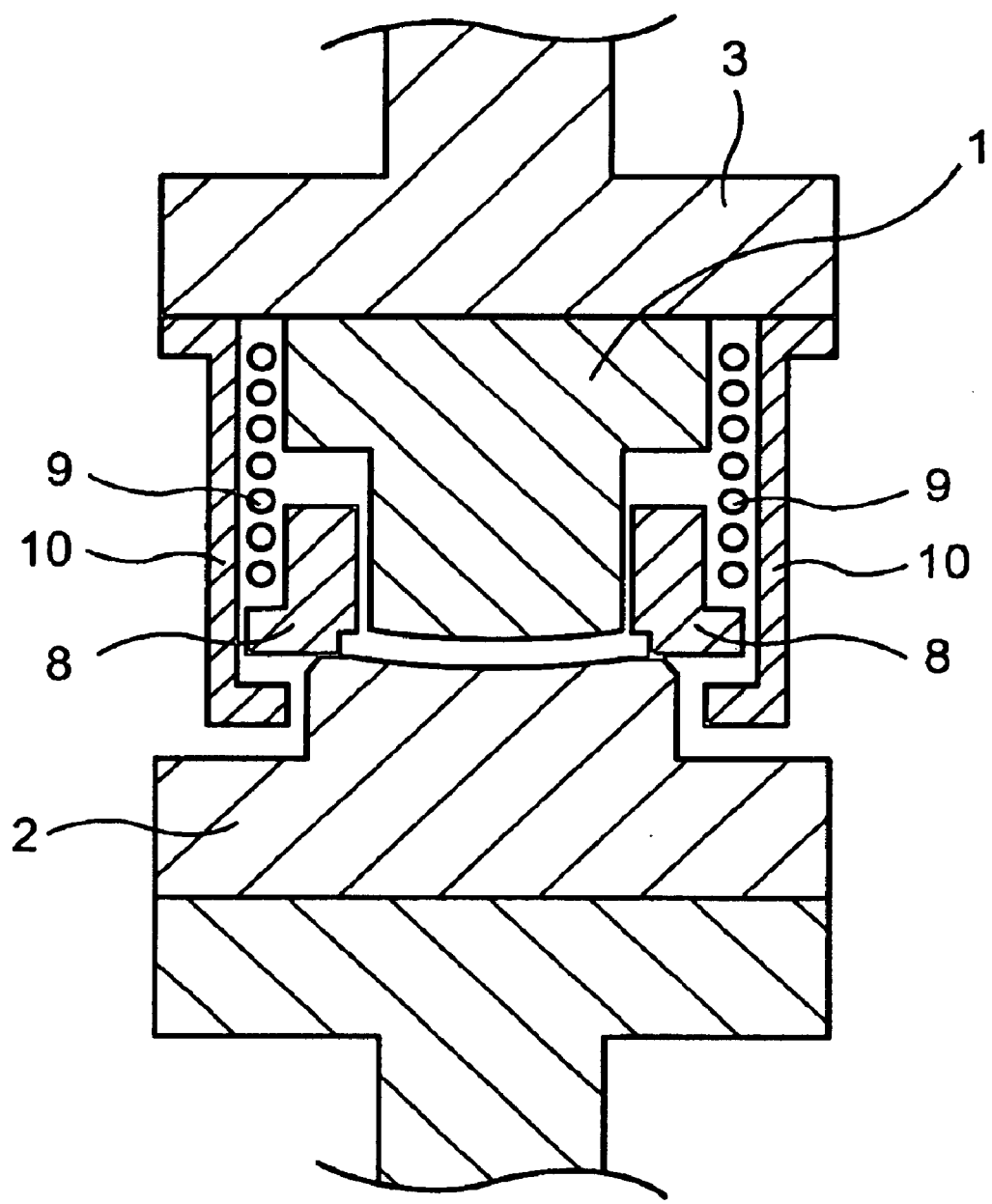
FIG. 3 is a schematic sectional view of the molding device for molded glass articles employed in Embodiment 2.

FIG. 3 shows the molding device employed in Embodiment 2. The difference between the molding device employed in Embodiment 1 and the molding device shown in FIG. 3 is the position of spring 9. In the molding device shown in FIG. 2, spring 9 is positioned between mold separating ring 8 and upper mold 1, while in the device shown in FIG. 3, spring 9 is positioned between mold separating ring 8 and main upper shaft 3. In the present embodiment, as in Embodiment 1, the device shown in FIG. 3 was employed to mold a 20 mm press diameter convex meniscus lens. The molded glass article obtained was extremely good from the viewpoints of thickness, surface precision, axial shift, and tilt. The outer diameter [portion] was removed in a subsequent step, yielding the final product.

Embodiment 3

A laser optical system microlens (object lens) was molded in the present embodiment using the molding device shown in FIG. 4. The outer diameter of the lens was determined by press molding.

The molding device shown in FIG. 4 comprises an upper mold forming unit that is approximately cylindrical and chiefly comprises an upper mold 12, an upper sleeve 14, and an upper plate 16, and a lower mold forming unit consisting of a lower mold 13, a lower sleeve 15, and a lower plate 17. Lower mold 13 and lower sleeve 15 can also be an integrated structure. Further, upper sleeve 14 is equivalent to a drum. Specifically, the upper mold forming unit comprises a disk-shaped upper plate 16; a hollow cylindrical upper sleeve 14 positioned beneath upper plate 16 and secured to upper plate 16; an upper mold 12 inserted into upper sleeve 14, positioned concentrically with upper sleeve 14, and having a forming surface on its lower end that presses down upon and forms a glass material; a mold separating ring 18 concentrically positioned with upper sleeve 14 and upper mold 12 and positioned on the inside of upper sleeve 14, comprising a forced mold separating means positioned on the outer rim of upper mold 12; and a spring 19 functioning as a displacement means (energizing means) positioned between mold separating ring 18 and outer mold 12 so as to push mold separating ring 18.

The lower mold forming unit comprises a lower plate 17, secured on its underside to a cylinder (not shown); a hollow cylindrical lower sleeve 15 positioned above lower plate 17, secured to lower plate 17, and shaped so as to envelope lower mold 13; and a lower mold 13 positioned concentrically with lower sleeve 15 and having an upper surface functioning as a forming surface that is configured to receive glass material.

Upper mold 12, lower mold 13, upper sleeve 14, lower sleeve 15, upper sleeve 16, and lower plate 17 are comprised of a binderless ultrahard alloy. Thin films of Pt—Rh—Au—Ir alloy are coated as protective films on the forming surfaces of upper mold 12 and lower mold 13 and on the inner surface of lower sleeve 15 coming into contact with the outer rim of the pressure formed lens.

Upper mold 12, lower mold 13, upper sleeve 14, and lower sleeve 15 are comprised of thermets such as silicon carbide, silicon, silicon nitride, tungsten carbide, aluminum oxide, or titanium carbide; one of these with a surface coating of diamond, heat-resistant metal, noble metal alloy, carbide, nitride, boride, oxide; or some other ceramic-coated compound. In particular, parts obtained by forming a silicon carbide film by CVD on a sintered silicon carbide member; machining it to a finished shape; and using ion plating or the like to form a carbon film consisting of a single-component layer or mixed layer of amorphous and/or crystalline graphite, such as an i-carbon film and/or diamond, are preferred. This is because [such parts] do not fuse even when molding at comparatively high temperatures and because of good mold separation properties facilitating separation from the mold at relatively high temperatures.

Figure 4A:
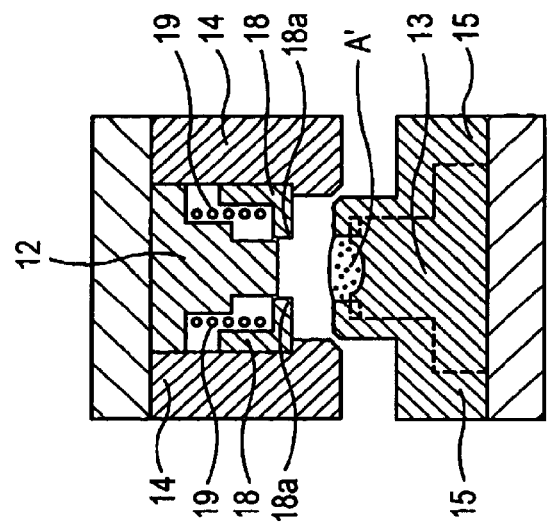
FIG. 4 is a schematic sectional view of the molding device for molded glass articles employed in Embodiment 3.
Figure 4B:
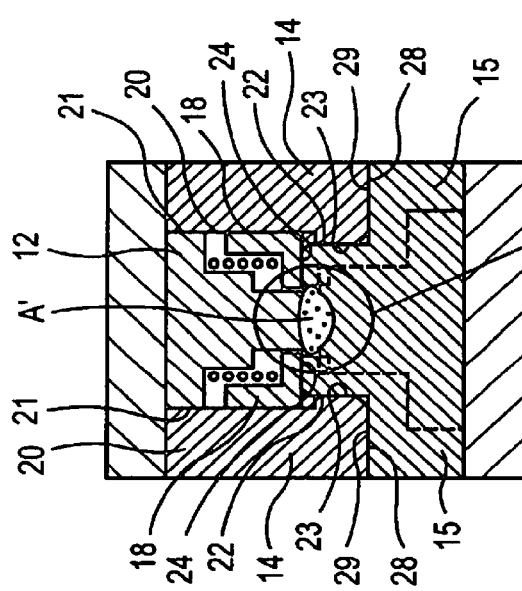

The molding device is assembled to the state shown in FIG. 4(b) before placement in the press; upper sleeve 14 and upper plate 16 are secured together with bolts, as are lower sleeve 15 and lower plate 17. However, upper mold 12 is not secured to upper plate 16, nor is lower mold 13 secured to lower plate 17. Thus, upper mold 12 can follow the contraction in volume of the molded glass article, permitting the upper mold forming surface to move in a manner maintaining contact with the molded glass article and thereby increasing the surface precision of the molded glass article obtained.

Tilting of the degree of parallelism between the parallel surfaces of the various parts is prevented. The clearance between the upper inner diameter 20 of upper sleeve 14 and the flange outer diameter 21 of upper mold 12, and the clearance between the lower inner diameter 22 of the upper sleeve and the outer diameter 23 of the lower sleeve are kept small to prevent axial shifting.

Upper mold 13 and lower sleeve 15 preferably comprise an integrated structure. However, upper mold 13 and lower sleeve 15 may be configured as separate parts.

Placement into the press is conducted as in Embodiment 1 (the centering holder is not necessary). As in Embodiment 1, glass material A (which is spherical here) is placed on lower mold A, the main lower shaft is raised, and press molding is conducted.

Figure 4C:
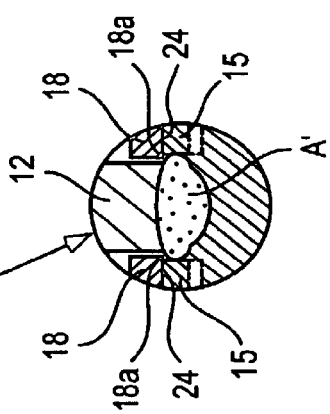

At the stage shown in FIG. 4(a), flange 25 of upper mold 12 is pressed by spring 19 and upper surface 26 of upper mold 12 contacts the lower surface 27 of upper plate 16. Then, as shown in FIG. 4(b), lower sleeve 15 is inserted so that the upper outer perimeter surface 23 of lower sleeve 15 faces the inner perimeter surface 22 of upper sleeve 14, thereby bringing upper mold 12 and lower mold 23 [sic: 13] into close proximity, and molded glass article A is press molded. At that time, the top surface 24 of lower sleeve 15 presses mold separating ring 18 upward, compressing spring 19 and storing an energizing force. Upper surface 28 of lower sleeve 15 strikes the upper surface 29 of upper sleeve 15 [sic: 14], yielding a molded glass article of constant center thickness. An enlarged view of the perimeter portion of molded glass article A' is shown in FIG. 4(c). During press molding, mold separating ring 18 is pushed upward by the upper surface 24 of lower sleeve 15 to a position higher than the forming surface of upper mold 12 and out of contact with molded glass article A'.

In the device of the present invention, since lower sleeve 15 is inserted so that its outer perimeter surface 23 faces the inner perimeter surface 22 of upper sleeve 14, the tilting of the upper mold that occurs in the device described in Japanese Patent Application Publication No. Hei 11-49523 does not occur.

Figure 4D:
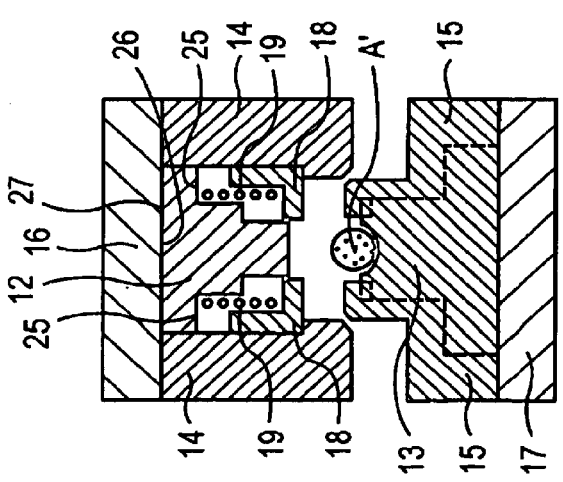

Immediately after press forming ends, the forming mold is cooled to below the glass transition point. During the cooling process, the glass contracts. However, since the force of spring 19 is relatively weak, while adhesion of upper mold 12 and molded glass article A' remains strong, upper mold 12 follows contraction of molded glass article A'. When the temperature of the molded glass article drops below the transition point, the force of spring 19 overcomes the adhesive force between the upper mold forming surface and the molded glass article, the upper mold is pushed upward by spring 19, and the mold opens. As shown in FIG. 4(d), as lower mold 13 drops, the force of spring 19 causes mold separating ring 18, which has been pressed upward above the forming surface of upper mold 12, to drop. This brings angled portion 18a of mold separating ring 18 in contact with the outer perimeter portion of molded glass article A', and as [mold separating ring 18] is pressed still further downward, causes molded glass article A' to reliably separate from the forming surface of upper mold 12. It can then be collected from lower mold 13.

In the device described in Japanese Patent Application Publication No. Hei 11-49523, the sleeve functions as both the forced mold separating means and the lower mold axis aligning means. By contrast, in the present embodiment, the forced mold separating means (mold separating ring 18) and the axis aligning means (upper sleeve 14) have been separated and are independent. Further, since adequate clearance has been provided between the outer perimeter of the forming surface of upper mold 12 and the inner perimeter of mold separating ring 18, there is no risk of radial shifting by upper mold 12 even when mold separating ring 18 is rocked by spring 19. Molded glass articles obtained had extremely good thickness, outer diameter, and surface precision, and since axial shifting and tilting had been dealt with, afforded extremely good frame performance.

However, surface precision was inadequate when the upper plate was secured to the upper mold in a manner preventing the upper mold from following contraction of the glass during cooling.

For ease of handling in the present embodiment, a lower plate was employed. However, the lower plate can be dispensed with and mounting conducted directly to main upper and lower shafts (or mold support members).

Embodiment 4

Figure 5:
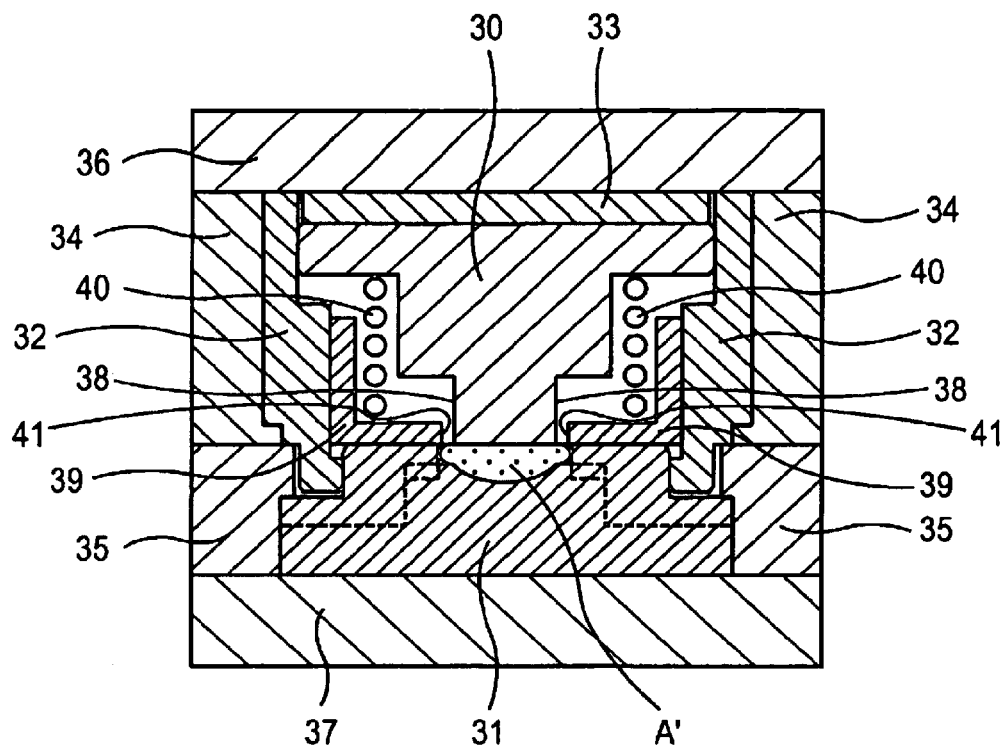
FIG. 5 is a schematic sectional view of the molding device for molded glass articles employed in Embodiment 4.

The device the sectional shape of which is shown in FIG. 5 was employed in the present embodiment.

The device shown in FIG. 5 differs from the device shown in FIG. 4 in that the material of the forming mold is different and in that an upper matrix 34 is provided on the outer perimeter of upper sleeve 32.

Upper mold 30, lower mold 31, and sleeve 32 are comprised of silicon carbide. At least the molding surfaces of the upper and lower molds are produced by CVD. A hard carbon film is coated on the forming surfaces as a protective film. Numeral 33 denotes a spacer for height adjustment made of silicon carbide or stainless steel. Upper matrix 34, lower matrix 35, upper plate 36, and lower plate 37 are tungsten alloys. Mold separating ring 39 is comprised of stainless steel and spring 40 is comprised of zirconia. Although the constituent materials are basically the same as those in Embodiment 3, since the silicon carbide is not heated by high-frequency induction and matrices comprised of tungsten alloys are heated by induction, the upper mold 30, lower mold 31, and sleeve 32, which are comprised of silicon carbide, are heated indirectly. High-frequency heating is highly advantageous for accelerating the speed at which the temperature is raised. Further, with high-frequency heating, there is just a coil and no thermal insulation around the forming molds, so the speed at which the temperature is decreased can be accelerated.

In the device described in Japanese Patent Application Publication No. Hei 11-49523, the sleeve is both the forced mold separating means and the lower mold axis aligning means. By contrast, in the present embodiment, the forced mold separating means (mold separating ring 39) and the axis aligning means (sleeve) are separate and independent. Further, since there is adequate clearance provided between the forming surface outer perimeter 38 of upper mold 30 and the inner perimeter 41 of mold separating ring 39, there is no risk of radial shifting of upper mold 30 even when mold separating ring 39 is rocked by spring 40. The molded glass articles obtained had extremely good thickness, outer diameter, and surface precision, and afforded extremely good frame performance.

Embodiment 5

Figure 6:
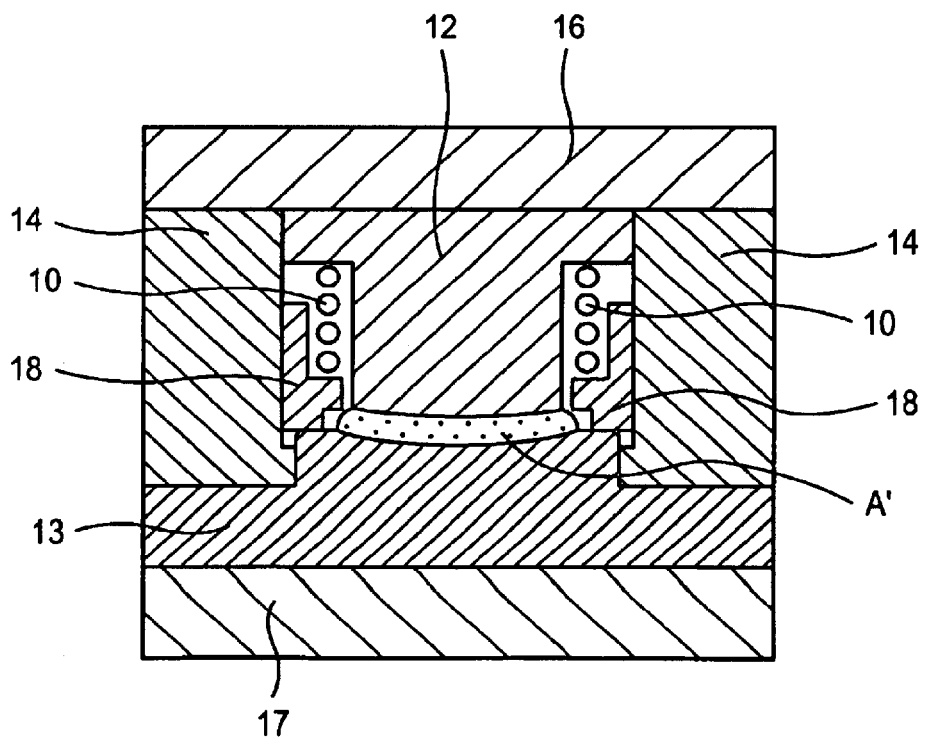
FIG. 6 is a schematic sectional view of the molding device for molded glass articles employed in Embodiment 5.

The device molding device shown in FIG. 6 was employed in the present embodiment. The molding device shown in FIG. 6 differs from the device shown in FIG. 4 in the shape of the mold separating ring; the basic mold structure and materials are identical. In the present embodiment, the same convex meniscus lenses (press diameter 20 mm) were formed as in Embodiment 1. The molding conditions and the like were basically identical to those in Embodiment 3. Excellent results were obtained, as in the other embodiments.

Embodiment 6

Figure 7:
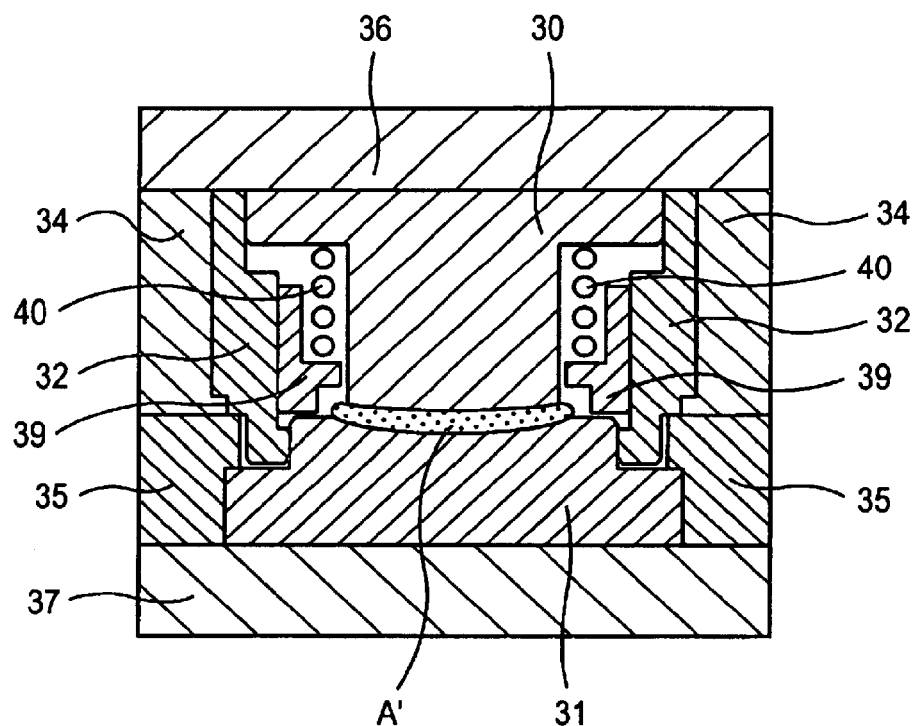
FIG. 7 is a schematic sectional view of the molding device for molded glass articles employed in Embodiment 6.

The molding device shown in FIG. 7 was employed in the present embodiment. The molding device shown in FIG. 7 differs from the device shown in FIG. 5 in the shape of the mold separating ring; the basic mold structure and materials are identical. In the present embodiment, the same convex meniscus lenses (press diameter 20 mm) were formed as in Embodiment 1. The molding conditions and the like were basically identical to those in Embodiment 4. Excellent results were obtained, as in the other embodiments.

Embodiment 7

Figure 8:
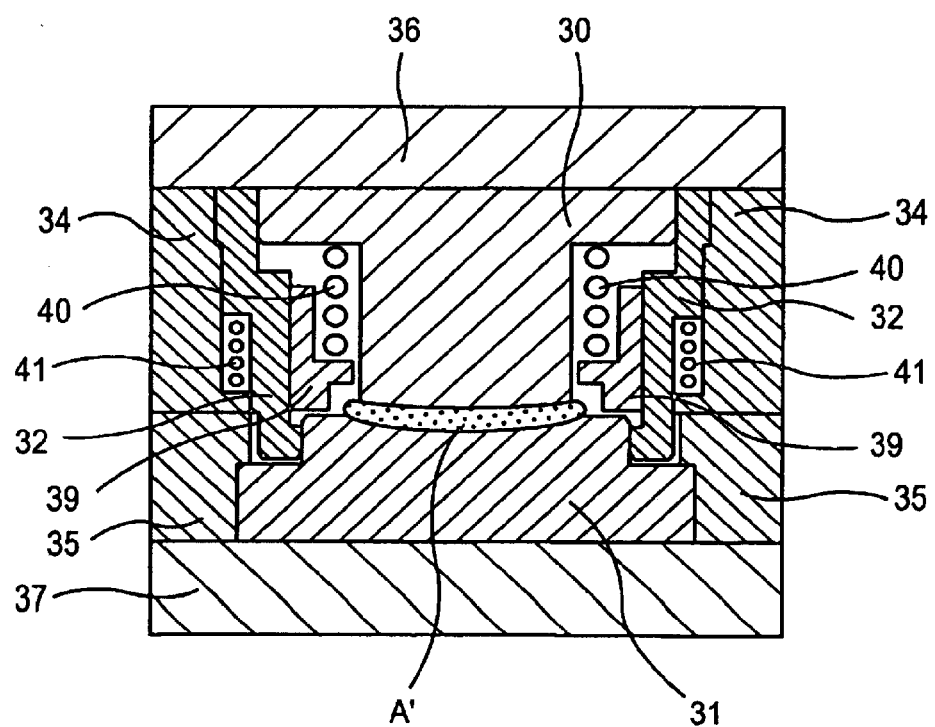
FIG. 8 is a schematic sectional view of the molding device for molded glass articles employed in Embodiment 7.
Figure 9:
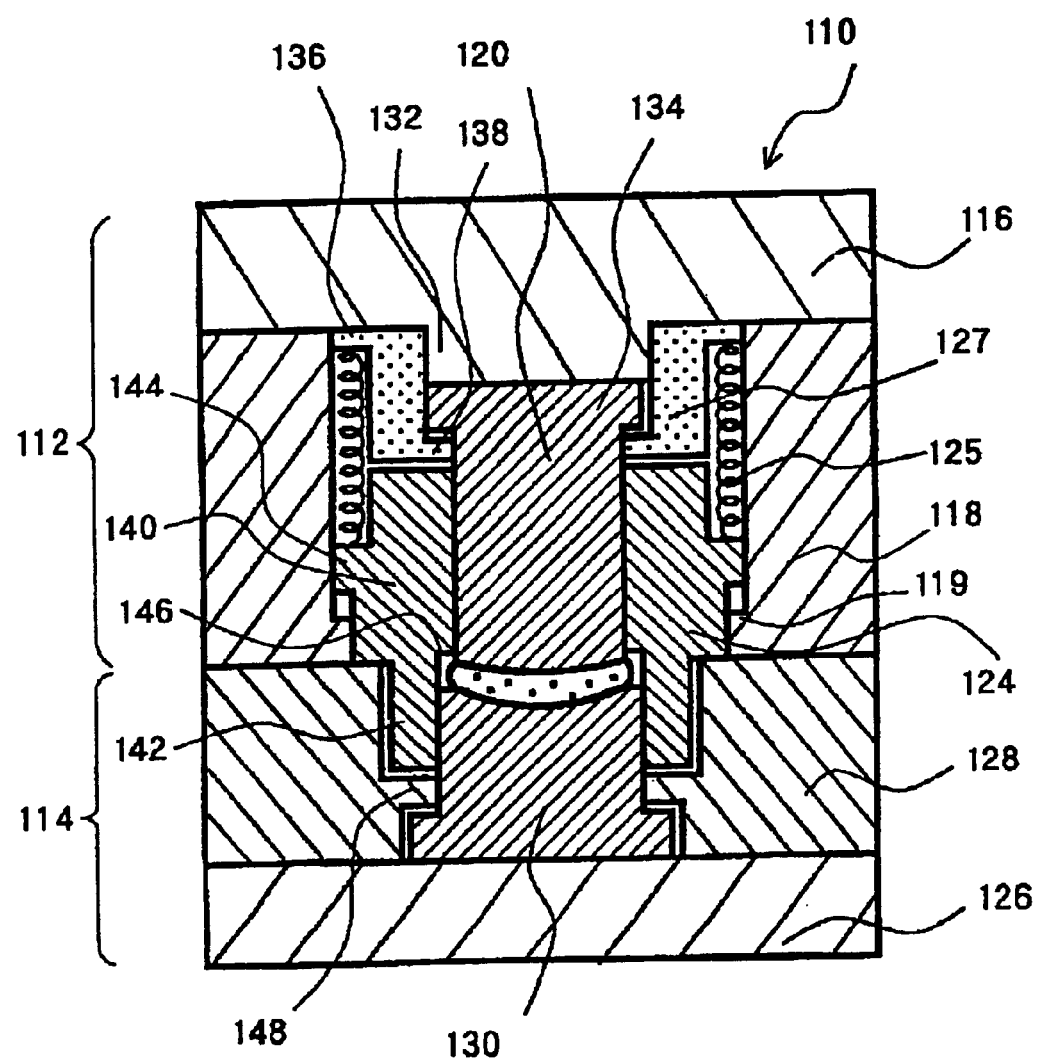
FIG. 9 is a schematic sectional view of the structure of the forming mold described in Japanese Patent Application Publication No. Hei 11-49523.
Figure 10:
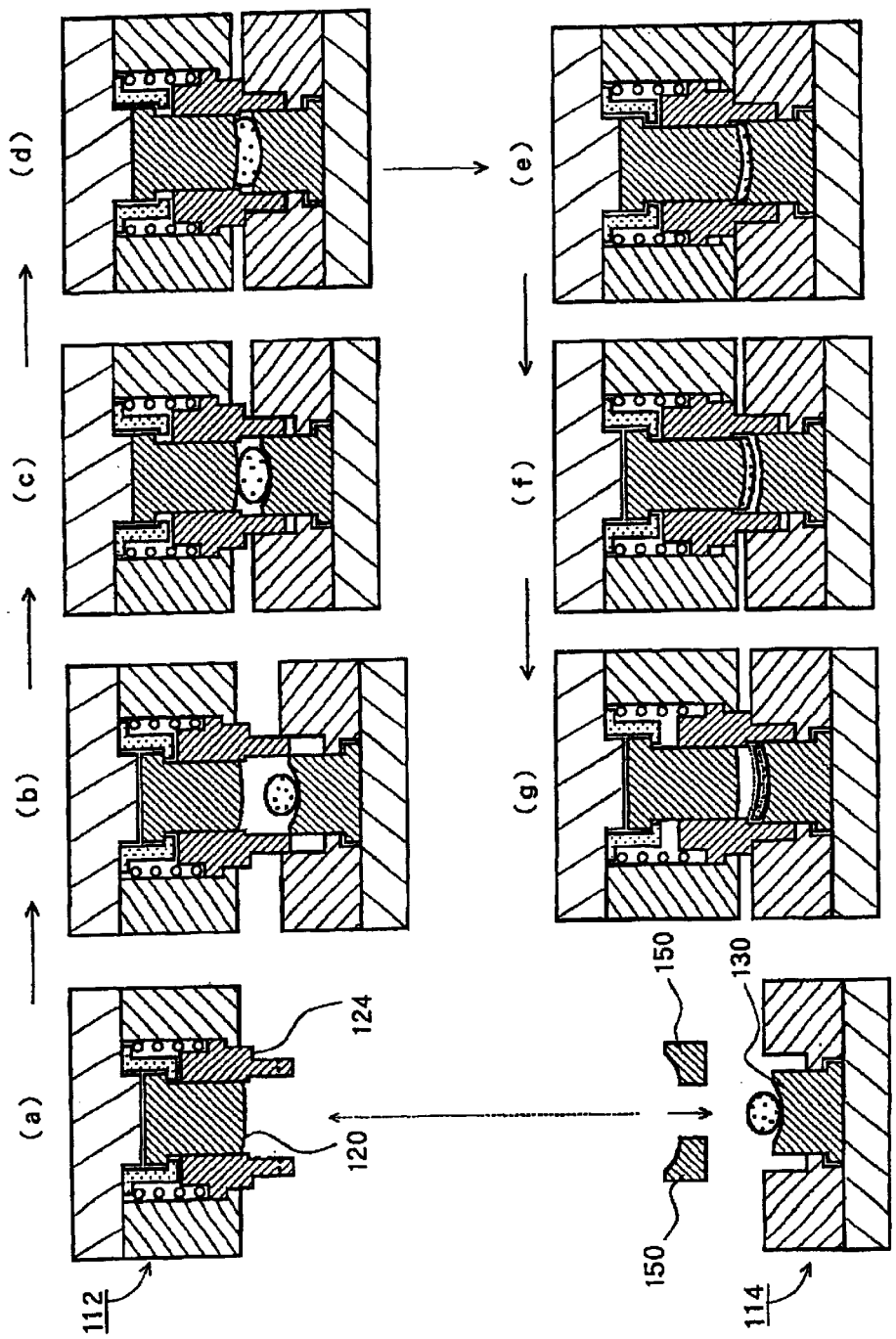
FIG. 10 is a schematic of the molding method employing the forming mold described in Japanese Patent Application Publication No. Hei 11-49523.

The molding device shown in FIG. 8 was employed in the present embodiment. The device shown in FIG. 8 has the same basic mold structure and materials as the device shown in FIG. 7 except that a spring 41 is provided between sleeve 32 and upper sleeve 34 and sleeve 32 is pressed upward by spring 41. In the present embodiment, the same convex meniscus lenses (press diameter 20 mm) were formed as in Embodiment 1. The molding conditions and the like were basically identical to those in Embodiment 4. Excellent results were obtained, as in the other embodiments. However, in the molding device shown in FIG. 8, even when sleeve 32 temporarily tilts relative to upper plate 36, the upward pushing of spring 41 corrects the tilting of sleeve 32. As a result, the upper surface of sleeve 32 and the lower surface of upper plate 36 coincide (contact each other). This is advantageous in that axial shifting between sleeve 32 and lower mold 31 can be prevented when inserting sleeve 32 into lower mold 31, sleeve 32 can be prevented from striking lower mold 31, and axial shifting of the upper and lower molds can be prevented.

Based on the present invention, molding devices and methods of forming molded glass articles with better surface precision while sustaining efficient production are provided. That is, axial shifting between the upper mold and lower mold is prevented based on the molded glass article manufacturing device of the present invention. As a result, when manufacturing molded glass articles such as lenses using the present device, the eccentricity of the lens can be controlled. Further, adhesion of the molded glass article to the forming surface of the upper mold or lower mold can be prevented based on the molded glass article manufacturing device of the present invention. As a result, the production efficiency of molded glass articles can be improved.

In the manufacturing methods employing the molded glass article manufacturing device of the present invention, cooling of the molded glass article to below the glass transition point can be conducted without opening the forming mold to improve surface precision (transfer precision).

We claim:

1. An apparatus for manufacturing an optical element comprising:
   an upper mold and a lower mold capable of being separated and approaching each other, each of the upper mold and the lower mold comprising a forming surface,
   a regulator for regulating the upper mold and the lower mold to align the axes thereof wherein the regulator regulates the upper mold and the lower mold by direct contact with the upper mold and the lower mold,
   a forcible releasing means for releasing the optical element adhered to a forming surface by contacting at least a rim portion of the optical element, and
   a moving means for moving the forcible releasing means relative to the upper mold or the lower mold such that, in the course of the separation of the upper mold and the lower mold, the forcible releasing means contacts at least a rim portion of the optical element to release the optical element from the forming surface.

2. The apparatus of claim 1, wherein the moving means moves the forcible releasing means in conjunction with movement of the upper mold or lower mold in the course of separation of the upper mold and the lower mold.

3. The apparatus of claim 1, wherein the regulator comprises a drum.

4. The apparatus of claim 3, wherein the regulator guides vertical movement of the forcible releasing means.

5. The apparatus of claim 1, wherein the forcible releasing means is capable of releasing the optical element adhered to a forming surface of the upper mold.

6. The apparatus of claim 5, wherein the moving means is placed in an outer periphery of the upper mold.

7. The apparatus of claim 6, wherein the forcible releasing means is positioned away from the forming surface of the upper mold such that the forcible releasing means is in non-contact with the optical element, when the upper and the lower mold are approached.

8. The apparatus of claim 7, wherein the moving means comprises a spring.

9. The apparatus of claim 8, wherein the regulator comprises a drum.

10. The apparatus of claim 9, wherein the regulator guides vertical movement of the forcible releasing means.

11. The apparatus of claim 10, wherein the regulator guides movement of at least one of the upper mold or the lower mold by a clearance of 2 to 10 $\mu$m.

12. A method of manufacturing an optical element by press molding a glass material with an upper mold and a lower mold, wherein each of the upper mold and the lower mold comprises an upper forming surface and a lower forming surface, respectively, comprising:
   press molding a heated glass material with the upper mold and the lower mold such that an outer diameter of said optical element becomes larger than an outer diameter of the upper forming surface,
   cooling the optical element, and
   separating the upper mold and the lower mold from each other,
   wherein the axes of the upper mold and the lower mold are regulated by a regulator in the press molding step wherein the regulator regulates the upper mold and the lower mold by direct contact with the upper mold and the lower mold, and
   in the separating step, a forcible releasing means is moved relative to the upper mold such that the forcible releasing means contacts a rim of the optical element adhered to the upper forming surface and releases the optical element from the upper forming surface.

13. The method of claim 12, wherein the regulator comprises a drum.

14. The method of claim 13, wherein the upper mold moves downward to follow shrinkage of the optical element in the cooling step.

15. The method of claim 14, wherein the upper mold, the lower mold and the glass material are heated to temperatures in a range corresponding to the viscosity of the glass material of $10^8$ to $10^{12}$ poises, prior to the press molding step, and the separating step is carried out when the optical element is cooled to a temperature not higher than the transition temperature of the glass material.

16. The method of claim 15, wherein the heated glass material is transferred to the forming surface of the heated lower mold, prior to the press molding step.

17. The method of claim 16, wherein the heated glass material is floated by a gas and is transferred to the heated forming surface of the lower mold.

* * * * *